(12) United States Patent
Nguyen

(10) Patent No.: US 6,311,279 B1
(45) Date of Patent: *Oct. 30, 2001

(54) NETWORK NODE WITH INTERNAL BATTERY BACKUP

(75) Inventor: Hai N. Nguyen, Spring, TX (US)

(73) Assignee: Compaq Computer Corporation, Houston, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/179,740
(22) Filed: Oct. 27, 1998
(51) Int. Cl.⁷ .......................................... G06F 1/26
(52) U.S. Cl. .............................. 713/300; 307/66; 320/116
(58) Field of Search ................................ 713/300, 340; 307/66, 71, 46, 48; 320/116, 117

(56) References Cited

U.S. PATENT DOCUMENTS

| | | | | |
|---|---|---|---|---|
| 4,860,185 | * | 8/1989 | Brewer et al. | 363/41 |
| 5,126,585 | * | 6/1992 | Boys | 307/66 |
| 5,781,422 | * | 7/1998 | Lavin et al. | 363/67 |
| 5,978,236 | * | 11/1999 | Faberman et al. | 363/37 |
| 5,990,577 | * | 11/1999 | Kamioka et al. | 307/26 |

* cited by examiner

Primary Examiner—Robert Beausoleil
Assistant Examiner—X. Chung-Trans
(74) Attorney, Agent, or Firm—Fletcher, Yoder & Van Someren

(57) ABSTRACT

A method and apparatus for providing uninterrupted DC power for network nodes. The uninterrupted DC power is derived from modular, stackable uninterruptible power supplies that fit within the housing of the network node. Because the battery of the uninterruptible power supply is charged from a DC output of a main power supply, only one AC/DC power converter is required. A high degree of efficiency is therefore obtained.

26 Claims, 4 Drawing Sheets

NETWORK NODE WITH INTERNAL BATTERY BACKUP

BACKGROUND AND SUMMARY OF THE INVENTION

The present invention relates to computer internal battery backups.

Electric Power

Standard alternating current (AC) power is generated by power utility companies. Utility-supplied power is subject to temporary loss due to a variety of reasons including but not limited to lightning induced surges on transmission lines, power plant failure, and downed transmission lines.

Effects of Power Failure on Electronics

Modern electronic devices rely heavily on integrated circuits (IC) for their operation. Most integrated circuits can be damaged by application of too much voltage or current to the IC. Power fluctuations may damage integrated circuits in electronic devices such as network routers, gateways, and hubs.

Loss of electric power (such as a blackout) can damage a computer or cause it to lose data. Very short (on the order of milliseconds) voltage dips and sags generally do not cause a computer to shut down or lose data. Most personal computers are designed to withstand voltage dips (brownouts) of about twenty percent without shutting down. Deeper dips or blackouts lasting for more than a few milliseconds may cause a computer to shut down. Any work that was not saved prior to shutdown is lost.

If the computer is writing to a disk during a power loss, the disk may be permanently damaged. These "head crashes" are the result of the disk drive's read/write heads coming into contact with the data storage disk.

Uninterruptible Power Supplies (UPS)

Uninterruptible power supplies provide backup power for the purpose of allowing electronic devices to continue to work during brief periods when no utility power is available. Additionally, uninterruptible power supplies may protect electronic devices by providing power conditioning to correct surges and/or sags in the power supply.

Uninterruptible power supplies are used in many computer installations such as network file servers, telecommunications equipment or other applications where a sudden loss of power would create an unacceptable and costly disruption of service. For example, there may be situations where data would be lost or corrupted if power failed during a data transfer. Perhaps the cost of a business shutdown due to the unavailability of a network device would be sufficient to justify the additional cost of an uninterruptible power supply for the network device. Thus, for various reasons there are numerous applications where an uninterruptible power supply is desirable and the number of these applications would increase substantially if the cost were reduced.

Originally, an uninterruptible power supply provided uninterrupted power because its output did not need to switch from line power to battery power. The battery was constantly and continuously connected to the system load. This type of UPS always supplied power from the batteries. The constant current drain from powering the load did not discharge the batteries because a large built-in charger was simultaneously charging them. When AC utility power failed, the charger stopped charging and the batteries discharged as they continued to supply power to the load.

Newer uninterruptible power supplies connect both the input utility power and the battery (typically through an inverter and transformer) to the load. When the utility power fails, the load switches to battery power. During this brief switching period, the load is connected to neither the main power supply nor the battery. To overcome this disadvantage, power supply transformers act as an energy storage system that supplies power while the load is being switched from utility to battery power and vice-versa.

Presently available uninterruptible power supplies most commonly are placed between the standard AC utility outlet and the AC utility plug of an electrical device (e.g. a computer) which must receive continuous electrical power. The typical UPS includes a battery for providing electrical energy in the event of a utility power failure, an AC to DC converter/battery charger, and an inverter for converting the battery's electrical energy from DC to AC when utility power is not available. The device being powered (for example, a computer's internal power supply) then receives the AC input from the uninterruptible power supply and in turn converts this to the various regulated and unregulated voltages required for the system.

FIG. 2 shows a prior art external uninterruptible power supply which in battery backup mode boosts the low battery voltages and generates a square wave AC output to feed into the AC input of a power supply.

The battery charger of the conventional UPS depicted in FIG. 2 converts AC power to DC power at approximately the battery voltage with a trickle charge being available to assure that the battery remains charged at all times. Typically the battery is a lead acid battery. The boost stage boosts the low voltage from the battery to an appropriate DC level. The inverter then reconverts the DC energy from the DC battery voltage back to an AC power supply approximating standard utility AC power. In the event of a power failure, the internal DC voltage from the AC to DC converter drops below the battery output voltage. This causes the battery to begin supplying AC power (by way of the inverter) to the device being powered (for example, a computer) in lieu of the utility AC power. The system proceeds with the battery supplying power until standard AC utility power is restored or the battery discharges. While such arrangements work satisfactorily, they are relatively expensive and inefficient. Such systems must work at relatively high power levels of typically two hundred to three hundred watts and are typically only 75 to 80 percent efficient. Consequently, substantial amounts of power must be dissipated within the uninterruptible power supply. Large and expensive components are therefore required to dissipate the resulting heat. In addition, the AC to DC converter, the inverter, and corresponding control circuits must be duplicated within the main power supply within the computer or other electrical device. The customer must therefore in effect purchase two power supplies; a standard device power supply plus an uninterruptible power supply.

FIG. 3 shows a prior art external uninterruptible power supply which in battery backup mode boosts the low battery voltages to a high DC voltage and feeds it into the AC input of a power supply. Note that this scheme differs from FIG. 2 in that the UPS inputs DC power, rather than AC, into the AC input of the main power supply and thereby eliminates the need for an inverter stage in the UPS. If the output of the UPS boost stage is set sufficiently high, the power supply's internal boost stage will automatically turn off. In an alternate embodiment, an external battery may be connected to the node between the UPS battery and boost stage. Note, however, that any additional battery would not be part of, nor charged by, the UPS.

FIG. 4 shows a prior art external uninterruptible power supply which in battery backup mode feeds the high voltage battery (typically in the range of 84VDC to 96VDC) into the AC input of a power supply or into a separate DC input of the power supply that connects to the power supply boost stage after the AC bridge of the power supply. This scheme differs from that shown in FIG. 3 in that the use of a high voltage battery allows the elimination of a boost stage in the UPS. In an alternate embodiment, the high voltage battery output can be switched directly into a separate DC input on the main power supply, thereby bypassing the main power supply AC input and bridge. As in the scheme of FIG. 3, the main power supply's boost stage will automatically turn off if the input DC voltage is sufficiently high.

FIG. 5 shows a prior art external uninterruptible power supply that generates matching DC outputs to the power supply that it is backing up. This UPS essentially is running in a redundant mode with the main power supply. This scheme differs from that shown in FIG. 4 in that the UPS DC outputs are connected directly to the main power supply DC outputs. A disadvantage of this scheme, as in the schemes of FIGS. 3 and 4, is that redundant circuitry is required because an AC to DC converter (in the battery charger) and corresponding control circuits must be duplicated within the main power supply of the computer or other electrical device.

In an alternate embodiment, an additional battery could be connected to the node between the UPS battery and DC-DC converter. Note, however, that any additional battery would not be part of, nor charged by, the UPS.

The UPS shown in FIG. 5 is similar to the UPS disclosed in U.S. Pat. No. 5,237,258 to Crampton. As can be seen, it is neither internal nor modular as defined in this application.

Computer Internal Battery Backups

Internal battery backups are not a novel idea. For example, computers have long had internal battery backups for the purpose of powering clocks and maintaining RAM contents. These usually are low-power disposable batteries suitable only for long-term trickle discharge. Internal battery backups therefore generally supply no power conditioning capability and are not capable of running an entire device, such as a server.

U.S. Pat. No. 4,860,185 to Brewer, for an integrated drop-in replacement computer power supply with UPS, discloses an UPS and power supply provided inside a common housing. However, the invention of Brewer seems to be restricted to computers. Additionally, the UPS of Brewer appears to not be modular in the sense that additional UPS modules cannot be added to extend the length of a battery backup period.

Network Node with Modular Internal Uninterruptible Power Supply

Disclosed herein is a network node with a modular internal uninterruptible power supply. Additional UPS modules may be added to a network node to increase the length of UPS operation when AC utility power is not available.

The disclosed innovations provide at least the following advantages: an ability to customize the length of UPS operation by adding additional modular internal UPS; higher efficiency because only one AC/DC power converter is required; higher reliability due to the low component count; lower cost due to the low component count; and no floor space is required for an external UPS because the preferred embodiment is internal to the device being powered.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 1:
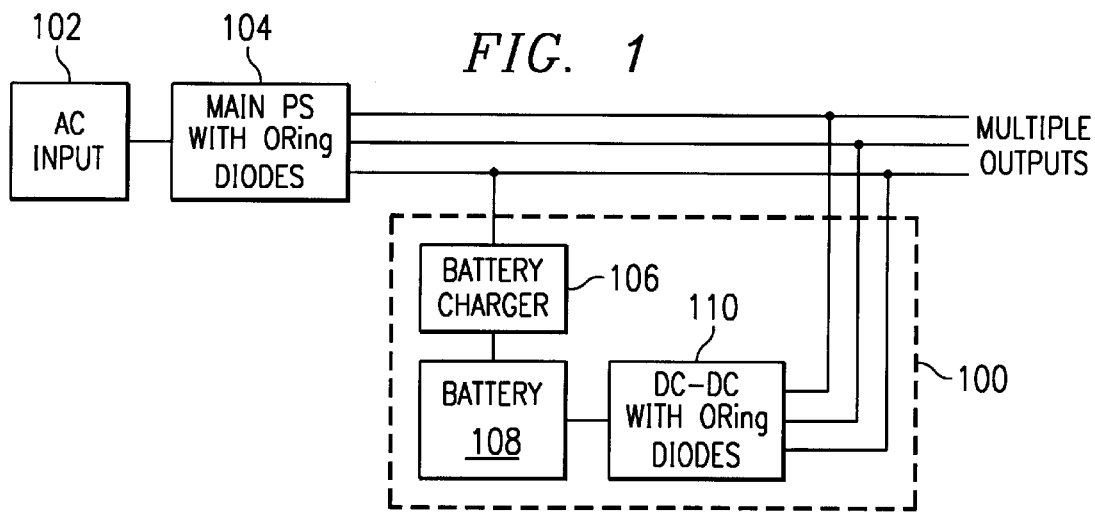
FIG. 1 shows a block diagram of an modular internal uninterruptible power supply system according to the presently preferred embodiment.
Figure 2:
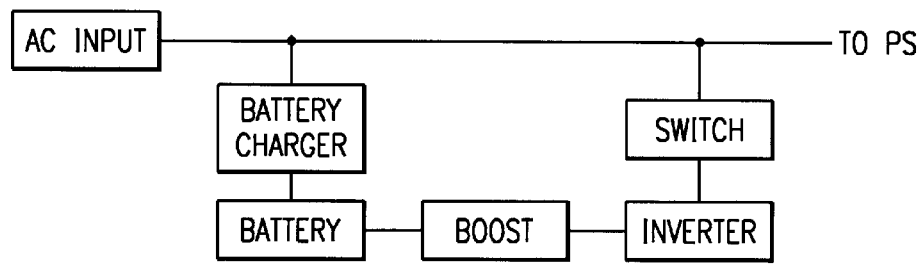
FIG. 2 shows a prior art external uninterruptible power supply with square wave AC output in battery backup mode.
Figure 3:
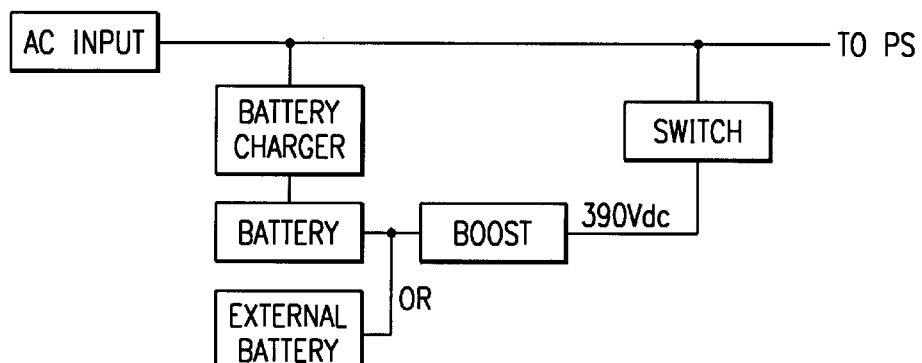
FIG. 3 shows a prior art external uninterruptible power supply with boosted high DC output in battery backup mode.
Figure 4:
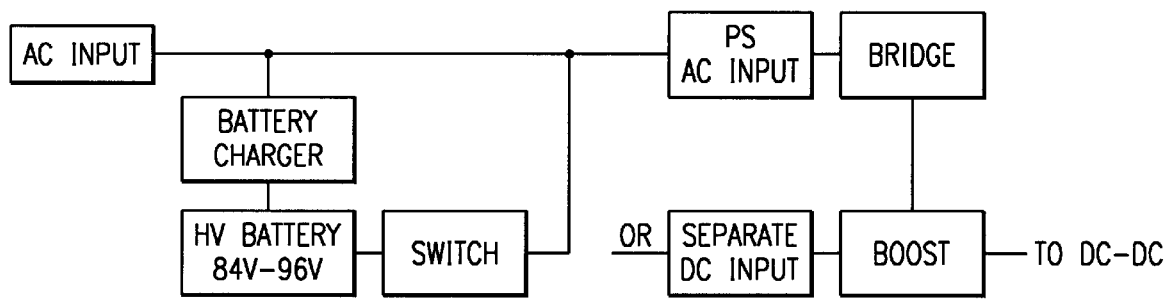
FIG. 4 shows a prior art external uninterruptible power supply with high voltage battery output in battery backup mode.
Figure 5:
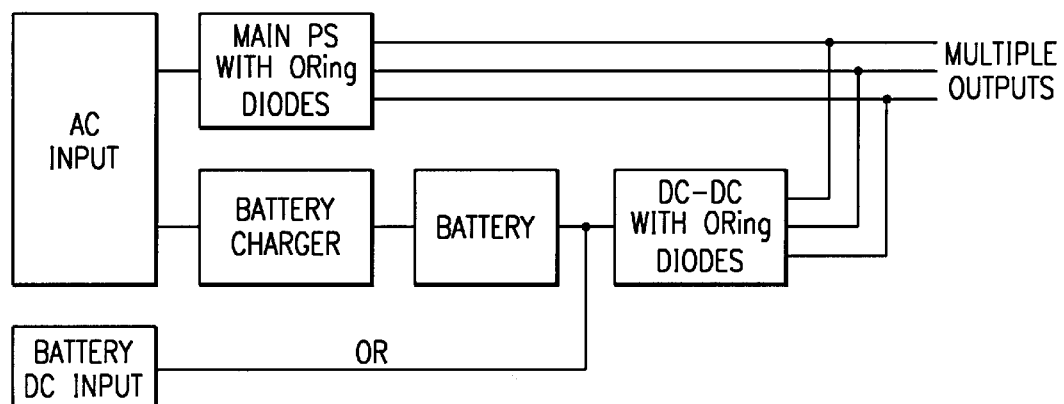
FIG. 5 shows a prior art external uninterruptible power supply with matching DC outputs in battery backup mode.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Definitions

Alternating Current (AC): electric current that reverses direction periodically, usually many times per second.

Blackout: complete loss of electric power.

Brownout: partial loss of electric power. E.g., it is commonly referred to as a "brownout" when AC voltage from the power utility dips such that electric lights dim but do not go out.

Direct Current (DC): electric current that flows in one direction only, as opposed to alternating current.

Frame: a sequence of data bits transmitted as a unit.

Gateway: a network device that provides a connection between two or more networks, passing messages from one network to addresses in another network. A gateway may perform extensive protocol translation if the networks have different communication schemes.

Head Crash: Computer disks are read by detection devices known as heads. The heads "fly" above the surface of the computer disk at several thousand RPM. When not being used to read data, the heads are stored in a safe position so that they will not contact the disk. A sudden loss of power may cause the heads to "crash" land on the disk, physically damaging the disk. Due to the speed at which disk drives revolve, even a momentary contact with the disk may cause extensive data loss.

Modular: designed for parallel operation with similar units; having inputs and outputs that may be connected, respectively, in parallel with the inputs and outputs of other similar devices. In particular, in the case of modular UPS: made to operate in parallel with additional modular UPS.

Network Hub: a central node with multiple nodes feeding into and through the central node. Because the multiple nodes are not directly interconnected, the hub allows the multiple nodes to communicate with one another.

Network Node: Networks are usually viewed as being composed of nodes with links interconnecting the nodes. A node is a point interconnection in a network. Some examples are servers, routers, hubs, and gateways.

Network Router: an inter-networking device that dynamically routes frames based upon the amount of traffic in the network.

Server: a node on a network that manages access to a shared resource. Examples are file servers that manage access to data storage devices such as large hard drives, tape drives, etc.; print servers that manage access to printers; and communication servers that manage access to communication devices, such as modem banks, or other networks.

Uninterruptible Power Supply (UPS): provides protection from main power supply failure and variations in power line voltage.

Internal Modular Uninterruptible Power Supply

FIG. 1 depicts a preferred embodiment of the present invention. An AC power source 102 supplies AC power to a main power supply 104 of a network node. The main power supply 104 converts the AC power to DC power. This DC power may be output at several different DC voltage levels, as required by the electronic device being powered.

In the embodiment shown, a modular internal uninterruptible power supply 100 incorporates a battery charger 106, a battery 108, and a DC-DC converter 110. At least one of the DC voltage outputs powers the battery charger 106. While AC power is available from AC power source 102, the battery charger 106 charges the battery 108. When the DC outputs of the main power supply 104 fail to maintain the correct voltage levels (due to loss of AC power, component failure, etc.), the DC-DC converter 110 uses the battery 108 to restore the DC outputs to their correct voltage levels until the battery is exhausted or AC power is restored.

Figure 6:
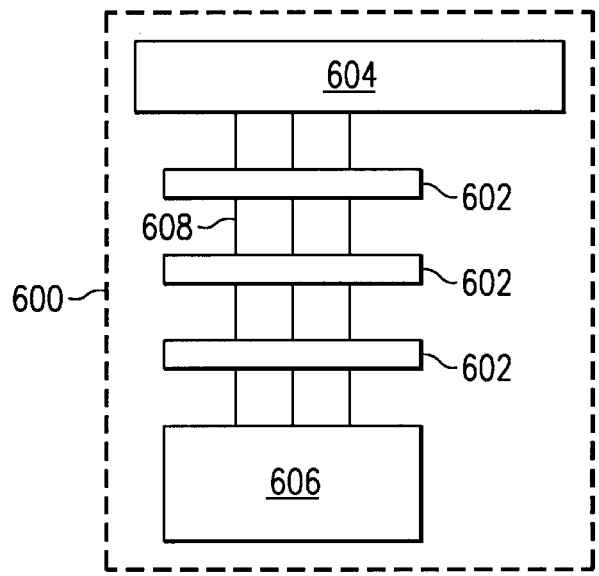
FIG. 6 depicts a network router with modular internal UPS.

FIG. 6 depicts a possible use of the preferred embodiment in a network router 600 with a plurality of bus slots 602 for modular uninterruptible power supplies 604. The period of UPS backup power can be increased by adding additional modular internal UPS 604 into any available bus slots 602. A bus 608 with DC lines connects the bus slots 602 to the main power supply 606 DC outputs.

Figure 7:
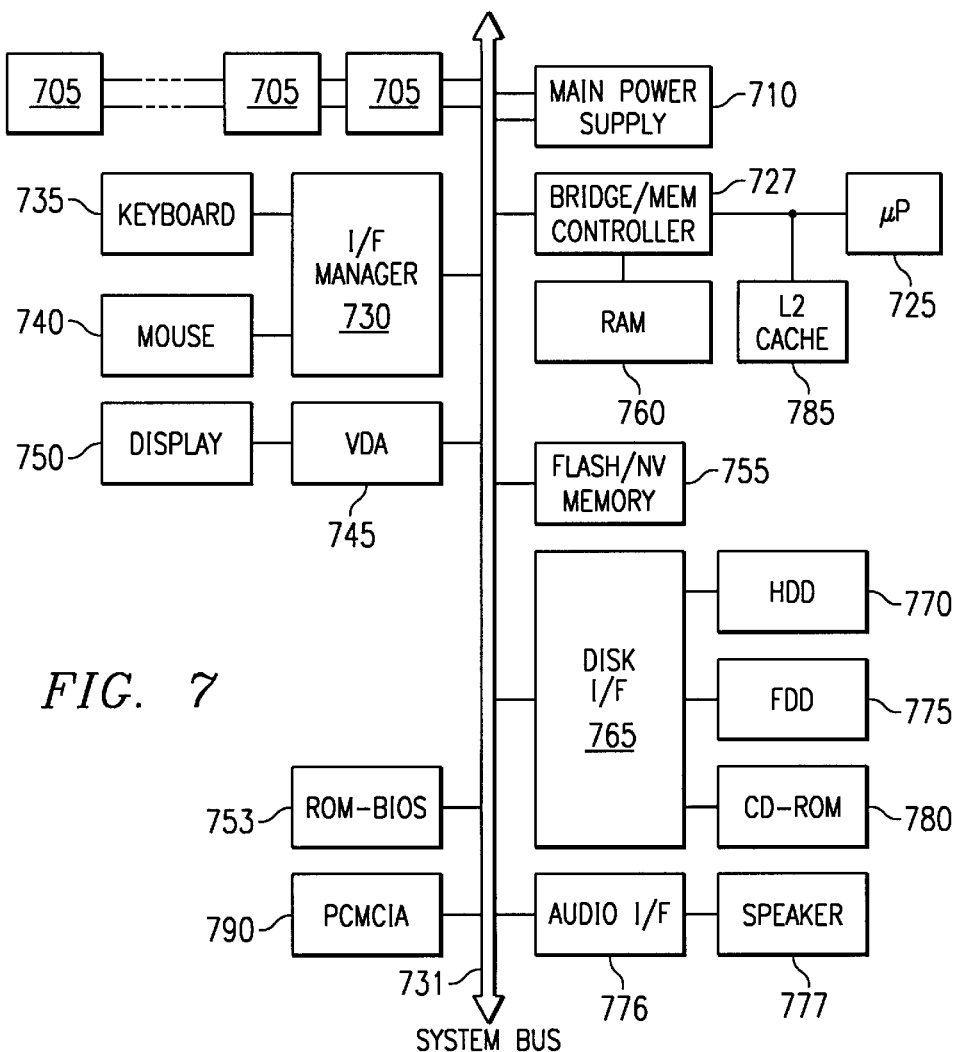
FIG. 7 is a block diagram of a server with modular internal UPS.

FIG. 7 depicts a block diagram of a server with modular internal uninterruptible power supplies 705. If main power supply 710 outputs fail, the UPS 705 will supply DC power to the server, which includes in this example: user input devices (e.g. keyboard 735 and mouse 740); at least one microprocessor 725 which is operatively connected to receive inputs from the input devices, across perhaps a system bus 731, through an interface manager chip 730 (which also provides an interface to the various ports); the microprocessor interfaces to the system bus through perhaps a bridge controller 727; a memory (e.g. flash or non-volatile memory 755, RAM 760, and BIOS 753), which is accessible by the microprocessor; a data output device (e.g. display 750 and video display adapter card 745) which is connected to output data generated by the microprocessor 725; and a mass storage disk drive 770 which is read-write accessible, through an interface unit 765, by the microprocessor 725.

Optionally, of course, many other components can be included, and this configuration is not definitive by any means. For example, the portable computer may also include a CD-ROM drive 780 and floppy disk drive ("FDD") 775 which may interface to the disk interface controller 765.

Additionally, L2 cache 785 may be added to speed data access from the disk drives to the microprocessor 725, and a PCMCIA 790 slot accommodates peripheral enhancements. The server may also accommodate an audio system for multimedia capability comprising a sound card 776 and a speaker(s) 777.

Figure 8:
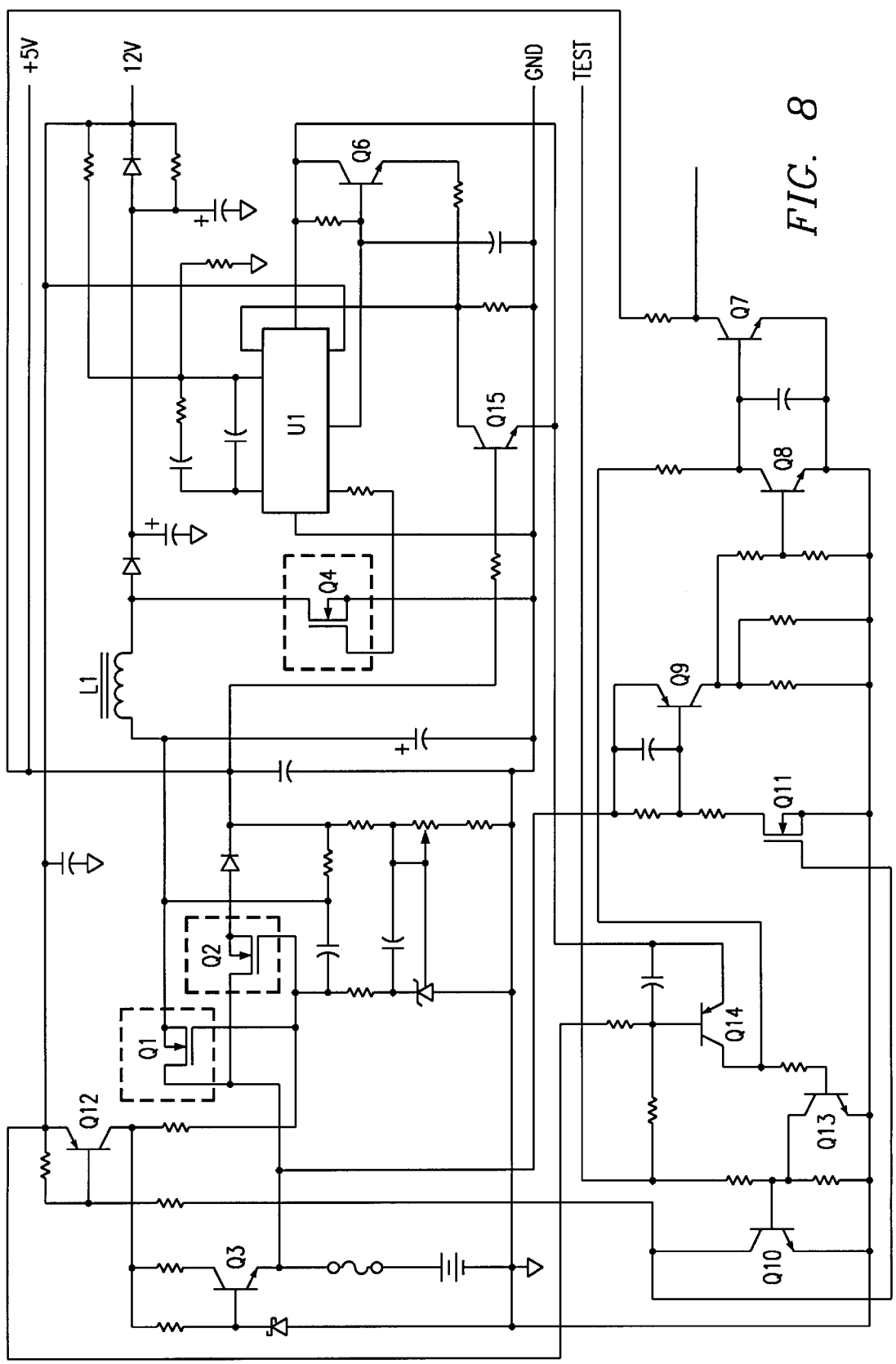
FIG. 8 is a schematic diagram of an embodiment of the disclosed modular internal uninterruptible power supply.

FIG. 8 is a schematic diagram of one embodiment of the innovative modular internal uninterruptible power supply. Battery BAT is charged by charging circuitry incorporating Q3 and Q12. This embodiment backs up a main power supply that has +5 VDC and +12 VDC output lines. The positive 5 Volt DC output is supplied by circuitry incorporating Q1 and Q2. The positive 12 Volt DC output is supplied by circuitry incorporating Q4, Q6, Q15, L1, and U1. An optional battery status circuit incorporates Q7, Q8, Q9, Q10, Q11, Q13, and Q14.

Figure 9:
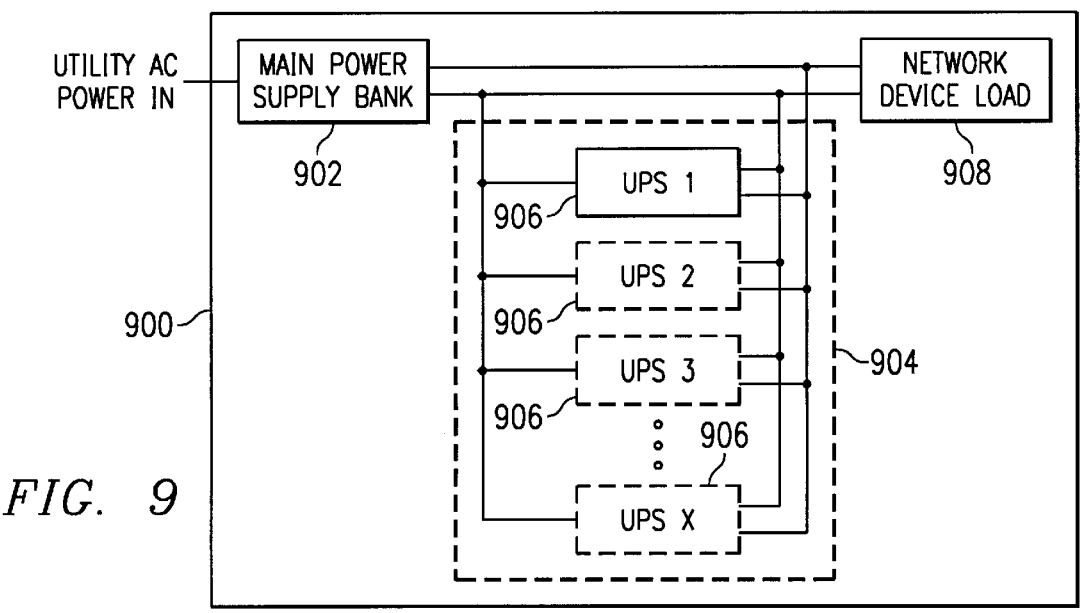
FIG. 9 is a block diagram of a main power supply bank and a bank of modular uninterruptible power supplies.

FIG. 9 is a block diagram of a network device 900 with a main power supply bank 902, which may contain more than one main power supply, and an internal modular uninterruptible power supply bank 904 which may contain more than one modular uninterruptible power supply 906. When utility power is available, the main power supply bank 902 provides DC power to the network device load 908 and to charge at least one UPS battery in the UPS bank 904. When utility power is not available, the UPS bank 904 will provide power to the network device load 908. Note that in an alternate embodiment the main power supply bank 902 could be external to the network device 900.

According to a disclosed class of embodiments, there is provided a computer system, comprising: a user input device, a microprocessor which is operatively connected to detect inputs from said input device, random-access memory which is connected to be read/write accessible by said microprocessor, and an output device operatively connected to receive outputs from said microprocessor; a main power supply functionally connected to provide power to said microprocessor and said memory; and an internal modular uninterruptible power supply functionally connected to provide DC power to said microprocessor and said memory when said main power supply fails to provide power within a predetermined range.

According to another disclosed class of embodiments, there is provided a computer system, comprising: at least one input device and at least one output device; a main system module which does not include said input and output devices, and which includes therein: at least one microprocessor which is operatively connected to detect inputs from said input device and to send data to said output device, and random-access memory which is connected to be read/write accessible by said microprocessor; at least one bus connected to said main system module, and having connections through which power can be supplied to said main system module; and an internal modular uninterruptible power supply functionally connected to provide DC power over said bus to said microprocessor and said random-access memory.

According to another disclosed class of embodiments, there is provided a portable computer system, comprising: a user input device, at least one microprocessor which is operatively connected to detect inputs from said input device, random-access memory which is connected to be read/write accessible by said microprocessor, and a display operatively connected to receive outputs from said microprocessor; main power supply circuitry, including at least one electrochemical power source, connected to provide power to said microprocessor, said memory, and said output device; and an internal modular uninterruptible power supply connected to provide DC power to said microprocessor and said memory when said main power supply fails to provide power within a predetermined range.

According to another disclosed class of embodiments, there is provided a computer network, comprising: at least two computers; and a network device, functionally connected to said computers, which incorporates at least one control unit which is operatively connected to detect inputs from said computers and to send data to said computers, a main power supply, and an internal uninterruptible power supply functionally connected to provide DC power to said control unit when said main power supply fails to provide power within a predetermined range.

According to another disclosed class of embodiments, there is provided a computer network subsystem, comprising: a hub for interconnecting computers, which includes therein: at least one control unit which is operatively connected to at least one computer, a main power supply, and an internal uninterruptible power supply functionally connected to provide DC power to said control unit when said main power supply fails to provide power within a predetermined range.

According to another disclosed class of embodiments, there is provided a computer network subsystem, comprising: a router for providing intelligent traffic routing, which includes therein: at least one control unit which is operatively connected to at least one computer, a main power supply, and an internal uninterruptible power supply functionally connected to provide DC power to said control unit when said main power supply fails to provide power within a predetermined range.

According to another disclosed class of embodiments, there is provided a computer network subsystem, comprising: a server for providing network access to a shared resource, which includes therein: at least one control unit which is operatively connected to at least one computer, a main power supply, and a modular internal uninterruptible power supply functionally connected to provide DC power to said control unit when said main power supply fails to provide power within a predetermined range.

According to another disclosed class of embodiments, there is provided a computer network subsystem, comprising: a gateway for providing, which includes therein: at least one control unit which is operatively connected to at least one computer, a main power supply, and an internal uninterruptible power supply functionally connected to provide DC power to said control unit when said main power supply fails to provide power within a predetermined range.

According to another disclosed class of embodiments, there is provided a modular uninterruptible power supply, comprising: a battery charger, having an input for accepting DC power and an output; a battery, operatively connected to said battery charger output; and a DC/DC converter having an input and a predetermined number of DC outputs, said input operatively connected to said battery; wherein said outputs of said DC/DC converter may be connected in parallel with outputs of DC/DC converters from additional modular uninterruptible power supplies.

According to another disclosed class of embodiments, there is provided a modular internal uninterruptible power supply method, comprising the steps of: (a.) when DC output voltages from a main power supply bank, which includes one or more power supply units, are within a predetermined tolerance, supplying power from said main power supply bank to a network device load and supplying excess power to charge at least one battery of an uninterruptible power supply bank, which includes one or more modular internal uninterruptible power supplies; and (b.) when DC output voltages from said main power supply bank are not within said predetermined tolerance, supplying power from said uninterruptible power supply bank to said network device.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Of course, in implementing power supply circuits and systems, safety is a very high priority. Those of ordinary skill in the art will therefore recognize the necessity to review safety issues carefully, and to make any changes in components or in circuit configuration which may be necessary to improve safety or to meet safety standards in various countries.

In the sample network embodiments disclosed herein, it is obvious to one skilled in the art that the terms "network devices" or "network nodes" can alternatively include gateways, routers, hubs, servers, or other networking electronics.

The user input devices in the sample computer system embodiments can alternatively include a trackball, a joystick, a 3D position sensor, voice recognition inputs, or other inputs. Similarly, the output devices can optionally include speakers, a display (or merely a display driver), a modem, or other outputs. The disclosed innovative ideas are not limited to systems using a single-processor CPU, but can also be implemented in computers using multiprocessor architectures. It should also be noted that the disclosed innovative ideas are not by any means limited to single-user desktop systems, but are also applicable to network servers, mainframe transaction processing systems, terminals, engineering workstations, and portable computers to which an external keyboard can be attached.

Additional general background, which helps to show the knowledge of those skilled in the art regarding the system context, and of variations and options for implementations, may be found in the following publications, all of which are hereby incorporated by reference: The Winn L. Rosch Hardware Bible, Brady Publishing, 1992; and Solutions '99, a UPS sales catalog for American Power Conversion Company.

What is claimed is:

1. A computer system, comprising:

a user input device;

a microprocessor operatively connected to detect inputs from said input device;

random-access memory operatively connected to be read/write accessible by said microprocessor;

an output device operatively connected to receive outputs from said microprocessor;

a main power supply comprising an input, an output, and first power converter circuitry operatively connected between said input and said output, wherein said input is configured to receive an AC signal and wherein said first power converter circuitry is configured to provide DC power at said output to said microprocessor and said memory; and an internal modular uninterruptible power supply (UPS) connectable to said output of said main power supply, said internal modular UPS comprising:

a power source; and second power converter circuitry operatively connectable between said output and said power source, wherein said power source and said second power converter circuitry are configured to provide DC power to said microprocessor and said memory only when said main power supply fails to provide DC power within a predetermined range, and wherein the first power converter circuitry is different than the second power converter circuitry.

2. The computer system of claim 1, wherein said power source comprises a chargeable power source operatively connectable to said system bus, said chargeable power source configured to be charged by DC power provided by said main power supply to said system bus.

3. A computer system comprising:
   at least one input device and at least one output device;
   a main system module which does not include said input and said output devices, and which comprises: at least one microprocessor operatively connected to detect inputs from said input device and to send data to said output device, and random-access memory operatively connected to be read/write accessible by said microprocessor;
   at least one bus connected to said main system module, and having connections through which DC power can be supplied by said main system module; and
   an internal modular uninterruptible power supply comprising:
      a power source; and
      a DC power output connected to said bus,
      wherein said uninterruptible power supply provides DC power at said DC power output from said power source when a DC voltage signal provided by the main system module on said bus is below a threshold value, and
      wherein said main system module is separate from said internal modular uninterruptible power supply.

4. The computer system of claim 3, wherein said power source comprises a chargeable power source configured to receive a charge current from said main system module from said bus.

5. A portable computer system, comprising:
   a user input device;
   at least one microprocessor operatively connected to detect inputs from said input device;
   random-access memory operatively connected to be read/write accessible by said microprocessor;
   a display operatively connected to receive outputs from said microprocessor;
   main power supply circuitry, including at least one electrochemical power source, and comprising an input and a DC output, wherein the input is configured to receive an AC signal and the DC output is configured to provide at least one DC power signal, wherein the main power supply circuitry is operatively connected to provide power to said microprocessor, said memory, and said display; and
   internal modular uninterruptible power supply circuitry operatively connected to the DC output of the main power supply and configured to provide DC power to said microprocessor and said memory only when said main power supply circuitry fails to provide power within a predetermined range, said internal modular uninterruptible power supply circuitry being different than said main power supply circuitry.

6. The portable computer system of claim 5, wherein said internal modular uninterruptible power supply incorporates a battery that is functionally connected for charging said battery from DC outputs of said main power supply circuitry.

7. A computer network, comprising:
   at least two computers; and
   a network device to interconnect said at least two computers, the network device comprising:
      at least one control unit configured to detect inputs from said computers and to send data to said computers;
      a main power supply comprising a DC output and main power conversion circuitry configured to provide DC power at said DC output to said control unit; and
      an internal uninterruptible power supply (UPS) comprising a UPS power source and UPS circuitry, said UPS circuitry being connected to the DC output of the main power supply and configured to provide DC power at said DC output from said UPS power source to said control unit only when said main power supply fails to provide DC power within a predetermined range, said UPS circuitry being different than said main power conversion circuitry.

8. The computer network of claim 7, wherein said network device is a router.

9. The computer network of claim 7, wherein said internal uninterruptible power supply is modular.

10. The computer network of claim 7, wherein said network device is a hub.

11. The computer network of claim 7, wherein said network device is a gateway.

12. The computer network of claim 7, wherein said network device is a server.

13. The computer network of claim 7, wherein said UPS power source comprises a chargeable battery operatively connected to said DC output of said main power supply to receive a charge current from said main power supply.

14. A modular internal uninterruptible power supply, comprising:
   a battery charger having an input connected to a main power bus for accepting DC power from a main power converter coupled to the main power bus;
   a battery operatively connected to said battery charger and
   a DC/DC converter having an input and a predetermined number of DC outputs, said input operatively connected to said battery, said DC outputs operatively connected to said main power bus;
   wherein said outputs of said DC/DC converter may be connected in parallel with outputs of DC/DC converters from additional modular uninterruptible power supplies,
   wherein the DC/DC converter is configured to provide power to the main power bus only when the main power converter fails to provide power within a predetermined range; and
   wherein the DC/DC converter is different than the main power converter.

15. A power supply to provide DC power to a computer system bus, comprising:
   a DC output;
   a first power conversion module connected to the DC output, the first power conversion module comprising first power conversion circuitry to provide a DC signal at the DC output; and a second power conversion module connectable to the DC output, the second power conversion module comprising a chargeable power source and second power conversion circuitry to provide DC power from the chargeable power source to the DC output when the DC signal provided by the first power conversion module falls below a threshold, wherein the first power conversion circuitry is different than the second power conversion circuitry.

16. The power supply as recited in claim 15, wherein the chargeable power source is operatively connectable to the DC output and is configured to receive a charge current from the first power conversion via the DC output.

17. The power supply as recited in claim 15, comprising a third power conversion module connectable to the DC output in parallel with the second power conversion module.

18. The power supply as recited in claim 15, wherein the chargeable power source comprises a battery.

19. The power supply as recited in claim 15, wherein the first power converter module comprises an AC input configured to receive AC power from an AC source.

20. The power supply as recited in claim 19, wherein the first power conversion circuitry comprises an AC/DC converter, and wherein the second power conversion circuitry comprises a DC/DC converter.

21. The power supply as recited in claim 15, wherein the first power converter module comprises an electrochemical power source.

22. The power supply as recited in claim 21, wherein the first power conversion circuitry comprises a first DC/DC converter, and wherein the second power conversion circuitry comprises a second DC/DC converter.

23. The power supply as recited in claim 15, wherein the power supply is disposed with a server.

24. The power supply as recited in claim 15, wherein the power supply is disposed within a router.

25. The power supply as recited in claim 15, wherein the power supply is disposed within a hub.

26. The power supply as recited in claim 15, wherein the power supply is disposed within a portable computer.

* * * * *